May 13, 1952     L. BRÉGUET     2,596,363
POWER TRANSMISSION MEANS FOR COAXIAL GYROPLANE ROTORS
Filed Aug. 13, 1946     2 SHEETS—SHEET 1
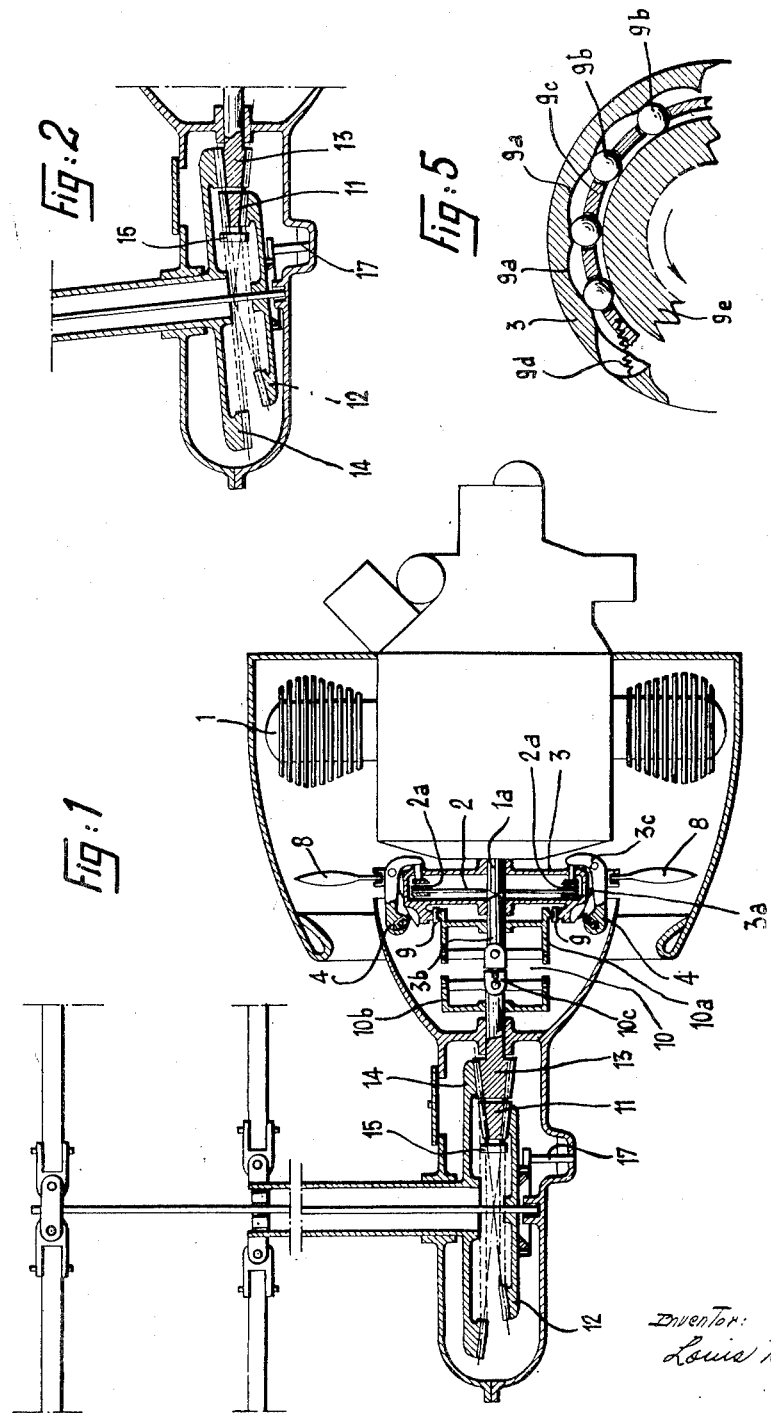

May 13, 1952 L. BRÉGUET 2,596,363
POWER TRANSMISSION MEANS FOR COAXIAL GYROPLANE ROTORS
Filed Aug. 13, 1946 2 SHEETS—SHEET 2
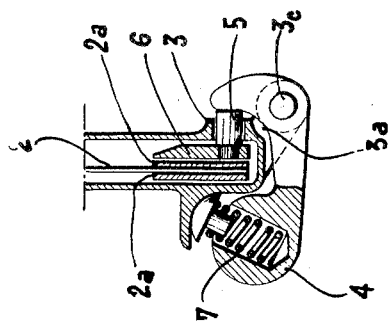
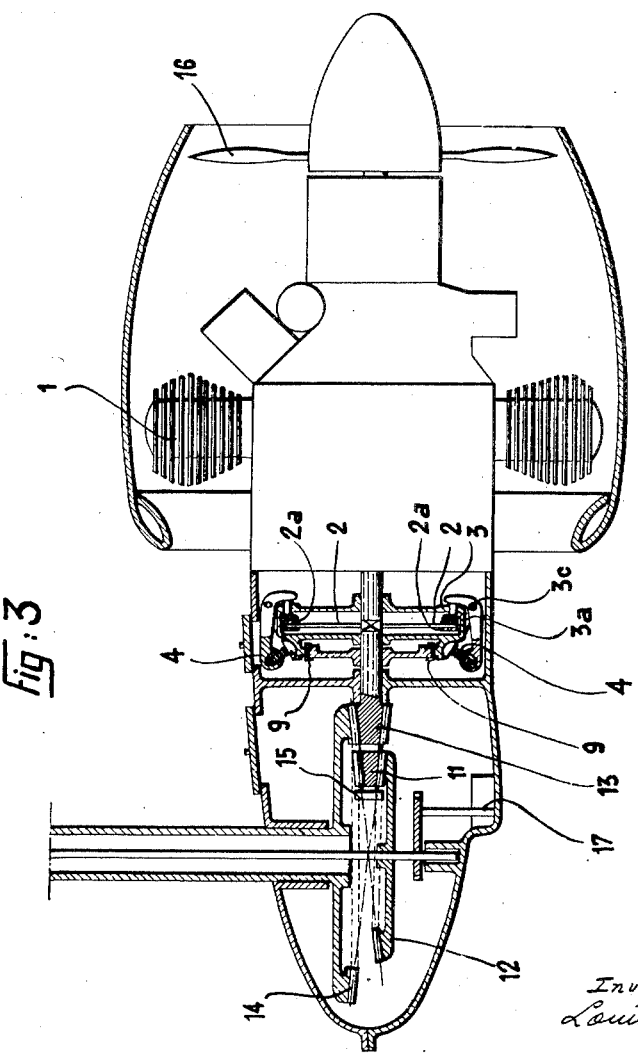
Inventor:
Louis Bréguet
Watson, Cole, Grindle & Watson
ATTys.

Patented May 13, 1952

2,596,363

UNITED STATES PATENT OFFICE 2,596,363

POWER TRANSMISSION MEANS FOR COAXIAL GYROPLANE ROTORS

Louis Bréguet, Paris, France

Application August 13, 1946, Serial No. 690,317
In France October 29, 1945

2 Claims. (Cl. 74—665)

My invention has for its object power transmitting means adapted for use in particular on a gyroplane provided with two coaxial rotors rotating in opposite directions and driven by an engine with horizontal axis.

My invention is chiefly characterized by the combination with an engine shaft, of a clutch mounted at the end of said shaft and rigid with a free wheel and of two bevel transmission gears comprising two pinions driven from said engine shaft and meshing respectively with two large bevel gears carried by the coaxial shafts of the rotors.

Preferably, the clutch arranged at the end of the shaft of the engine includes a single disc of a plurality of discs with a weak clutching spring and centrifugal locking means operating through small weights carried along by the driven part and adapted to hold energetically the discs fast as soon as the clutching is executed.

The above system allows obtaining a clutch of a very reduced size and weight corresponding no more to the maximum power of the engine but to the very small power of the clutch itself, the major part of the effort being furnished by the centrifugal fastening means.

To the driven part of the clutch is incorporated a free wheel allowing the rotors to rotate freely when the engine is stopped or when it is idling.

In the case where the mounting does not correspond to a rigid unit and the engine is for instance carried elastically, the transmission includes a double sliding Cardan arranged at the output end of the clutch.

The following description given out by way of example and by no means in a limited sense and corresponding to accompanying drawings will allow the manner of executing the invention to be easily understood.

In said drawings:

Figure 1 is a diagrammatic cross-section through the axis of the driving shaft of a transmission with a double Cardan joint and a mast perpendicular to the driving axis.

Figure 2 is a diagrammatic elevational view of bevel gears with a mast inclined forwardly.

Figure 3 is a cross-section similar to Figure 1 corresponding to the mounting as a rigid unit without any Cardan and with a fan at the rear.

Figure 4 illustrates the centrifugal locking means for a single disc clutch of the type disclosed.

Figure 5 is a diagrammatic elevational view of the free wheel.

In said drawings, the air cooled motor is shown at 1. The driving part 2 of the clutch rigidly secured to the engine shaft 1a is provided with a lining 2a on both sides. The driven part 3 of the clutch carries through pivotal links 3a centrifugal weights 4 adapted to fasten the driving part 2 through projections 5 and an annular disc 6. The clutch springs 7 are housed inside the weights and the disconnection is obtained through the axial displacement of the disc 6 through the agency for instance of stays inserted between the projections 5 forming part of the centrifugal fastening means, said stays passing through the driven part 3. These stays may be operated from the outside through levers controlled by a fork.

The blades 8 of the fan are secured to the driven part 3 of the clutch. The free wheel 9 comprises an outer member rigid with the clutch part 3 and provided with circular slopes 9a, rollers 9b, a roller cage 9c said cage being urged against rotation by springs 9d secured to the clutch part 3, and a smooth hub 9e keyed on the driven shaft 3b.

The double Cardan as illustrated at 10 comprises two single Cardan joints 10a and 10b rotating in unison and connected by a two part member 10c allowing said single Cardans to slide with respect to one another. The bevel gears with spiral teeth have received respectively the reference numbers 11 and 12 for the upper rotor, 13 and 14 for the lower rotor while the banjo carrying the end of the transmission is shown at 15.

In the case of a rigid unit as shown in Fig. 3, the fan is located at the rear at 16. A gear pump 17 allows the lubrication of the transmission and produces the oil pressure for the hydraulic adjustment of the pitch.

Obviously further modification may be brought to the form of execution described and it is possible in particular to replace such parts by technical equivalents without widening thereby the scope of the invention.

What I claim is:

1. A power transmission mechanism comprising in combination an input shaft, a driving clutch element secured on said shaft, a driven clutch element rotatably mounted on said shaft, a driven shaft, a free wheel interposed between said driven clutch element and said driven shaft for connecting them, means comprising centrifugal weights pivotally secured to said driven clutch element and weak springs interposed between said driven element and said weights, for locking said clutch in its engaged position for a predetermined speed of rotation, two bevel pinions driven from said driven shaft, two coaxial output shafts and bevel gears respectively secured to said output shafts and meshing respectively with said bevel pinions.

2. The combination of claim 1 wherein said bevel pinions are connected to said driven shaft through the intermediary of a double sliding Cardan joint.

LOUIS BRÉGUET.

REFERENCES CITED

The following references are of record in the file of this patent:

UNITED STATES PATENTS

| Number | Name | Date |
|---|---|---|
| 2,274,743 | Rosskoff | Mar. 3, 1942 |
| 2,301,930 | Cattaneo | Nov. 17, 1942 |
| 2,336,966 | Short | Dec. 14, 1943 |
| 2,371,872 | Caldwell et al. | Mar. 20, 1945 |
| 2,372,883 | Daub | Apr. 3, 1945 |
| 2,377,457 | Stalker | June 5, 1945 |
| 2,380,889 | Waseige | July 31, 1945 |
| 2,389,778 | Fedden et al. | Nov. 27, 1945 |
| 2,400,835 | Levin | May 21, 1946 |
| 2,403,797 | Hersey | July 9, 1946 |